US005972814A

United States Patent [19]

Schild, III et al.

[11] Patent Number: 5,972,814

[45] Date of Patent: Oct. 26, 1999

[54] REINFORCED NONWOVEN METAL FABRIC

[75] Inventors: Kurt H. Schild, III, Beach Park; Terrence Kane, Morton Grove; Alex Krupnik, Northbrook, all of Ill.

[73] Assignee: Global Material Technologies, Inc., Palatine, Ill.

[21] Appl. No.: 08/881,961

[22] Filed: Jun. 25, 1997

[51] Int. Cl.[6] .................................................. B32B 5/06

[52] U.S. Cl. .......................... 442/377; 442/388; 442/390; 28/108

[58] Field of Search ............................... 28/107; 442/377, 442/388, 389, 390

[56] References Cited

U.S. PATENT DOCUMENTS 4,779,322 10/1988 Dendooven ............................ 29/419.1

*Primary Examiner*—Christopher Raimund

*Attorney, Agent, or Firm*—Laff, Whitesel & Saret, Ltd.

[57] ABSTRACT

A reinforced nonwoven metal fabric is disclosed. A mass of loose metal fibers is processed through suitable textile apparatus to result in a metal fiber web, which is then lapped to form a multi-layered structure. This structure is then formed into a metal fabric via needle-punching. A suitable backing is then introduced during or after the needle-punch process, resulting in a reinforced nonwoven metal fabric having superior strength and durability.

7 Claims, 3 Drawing Sheets

REINFORCED NONWOVEN METAL FABRIC

FIELD OF INVENTION

This invention relates to nonwoven metal fabrics and methods for making such fabrics.

BACKGROUND OF THE INVENTION

It is known to create nonwoven metal fabrics by forming a nonwoven web of metal fibers, overlaying portions of the nonwoven metal fiber web to form a multilayer structure, and then needle-punching the multilayer structure to form a coherent metal fabric.

Unfortunately, the nonwoven metal fabrics made by this process tend not to be suitable for many applications because they lack tensile strength. In particular, when used in abrasive applications, such fabrics tend to ball up, tear and fray.

Accordingly, there is a need for a nonwoven metal fabric having improved strength characteristics

SUMMARY OF THE INVENTION

An object of this invention is to provide a nonwoven metal fabric having improved strength characteristics resulting from being joined to a reinforcing backing.

According to one aspect of the invention, a reinforced nonwoven metal fabric is formed by providing a mass of loose metal fibers. Some of the individual fibers are separated from the mass and formed into a fiber web. The fiber web is then lapped and laid on top of a suitable reinforcing material to form multiple layers of metal fibers on a reinforcing backing. The multiple layers are then needle-punched in order to interengage the metal fibers with each other and with the backing material, to form a reinforced nonwoven metal fabric.

According to another aspect of the invention, the reinforcing material attached via needle-punch to the multi-layer structure contains polymeric fibers. This allows for the reinforcing material to be further secured to the nonwoven metal fabric by fusion bonding. After attachment of the reinforcing material via needle-punching, the reinforced fabric is heated and pressed or calendared such that the polymer fibers melt and become fused with the metal fabric. In the process, the metal fibers are bent over and pressed into the heated polymer fibers, and are thereby “locked” into place.

According to another aspect of the invention, the reinforcing material may be a latex or foam backing. Such material is applied to the metal fabric in a liquid form by roll-coating or frothing, or any other of a number of known methods. It is then cured in a curing oven to solidify the backing.

It will be appreciated by those of skill in the art that a variety of other reinforcing materials may be used. Polypropylene or urethane foam may be attached using a suitable glue, for example.

According to a preferred aspect of the invention, the unreinforced nonwoven metal fabric is preferably formed by providing a mass of loose fibers, separating some of the fibers from the mass, and carding/garnetting the separated fibers on a card or garnett machine to form a fiber web. The fiber web is then lapped to form multiple layers of metal fibers, and the multiple layers are then needled in order to interengage the fibers and form the nonwoven metal fabric.

According to another preferred aspect of the invention, the individual metal fibers are formed by shaving a metal member with a succession of serrated blades, resulting in fibers having irregular cross-sections and rough, barbed, outer surfaces. The irregular cross-sections vary alone the lengths of the fibers. The resulting shaved fibers are provided with a suitable lubricant prior to carding or garnetting.

Other objects, advantages, and novel aspects of the present invention will become apparent in the detailed description of the invention that follows, which includes the preferred embodiment of the invention and the best mode contemplated for carrying out the invention. This detailed description may be understood by reference to the attached drawings.

DETAILED DESCRIPTION OF THE PREFERRED EMBODIMENT

In general, a metal fabric is made according to the present invention by providing a mass of fibers, separating some fibers from the mass and forming a fiber web, lapping the fiber web to form a multi-layered structure, and then needle-punching the multi-layered structure to interengage individual fibers from within both the same and different layers. In the preferred embodiment, the fibers are cut to predetermined lengths of between about 1 and 12 inches, and then carded or garnetted on a card or garnett machine before the lapping and needling. The carding/garnetting step improves the uniformity, density, heat dissipation and strength characteristics of the resulting nonwoven metal fabric. The resulting nonwoven metal fabric is then bonded to a suitable reinforcing backing material by any of a number of methods to create a reinforced nonwoven metal fabric.

Figure 1:
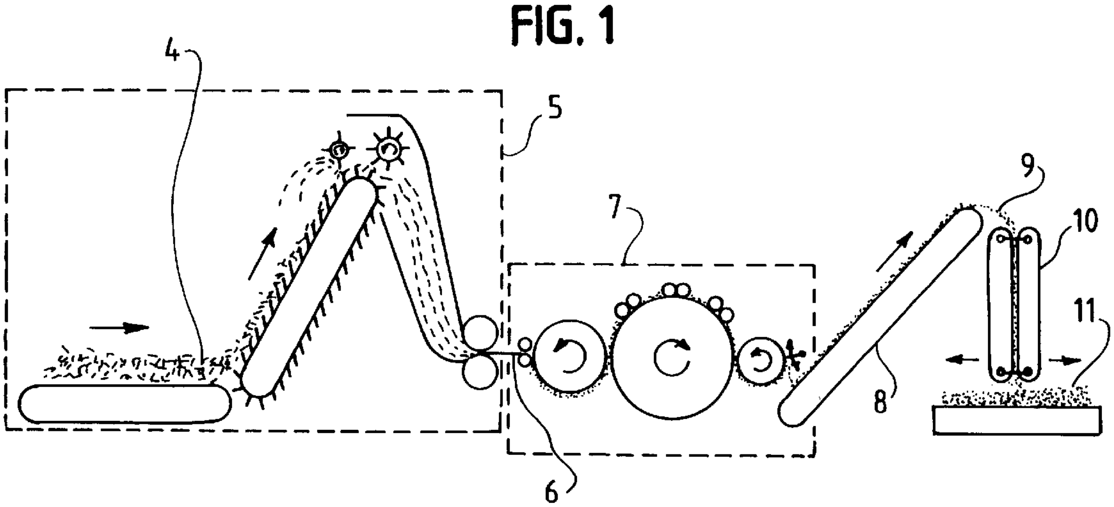
FIG. 1 is a schematic showing the formation of a multilayered fiber web.

Referring now to FIG. 1, a mass of loose metal fibers 4 is provided. The loose metal fibers 4 may be formed by any of a number of conventional methods known to those of skill in the art, such as wire drawing, foil slitting, broaching, shaving, and turning. Various methods for forming metal fibers are described in “Continuous Filament Reinforcements,” Chapter 31 entitled “Metal Filaments,” by John A. Roberts, the teachings of which are incorporated herein by reference.

Figure 2A:
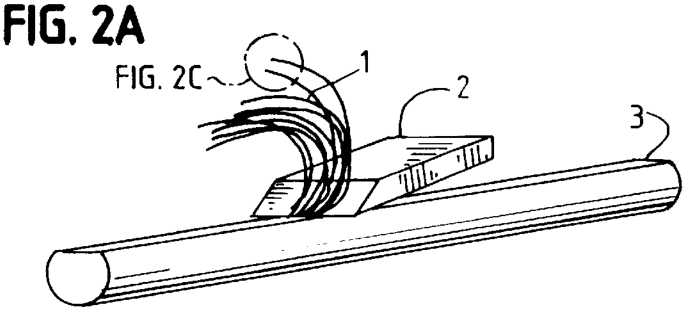
FIG. 2*a* is a schematic showing the formation of shaved metal fibers in accordance with the preferred embodiment.
Figure 2B:
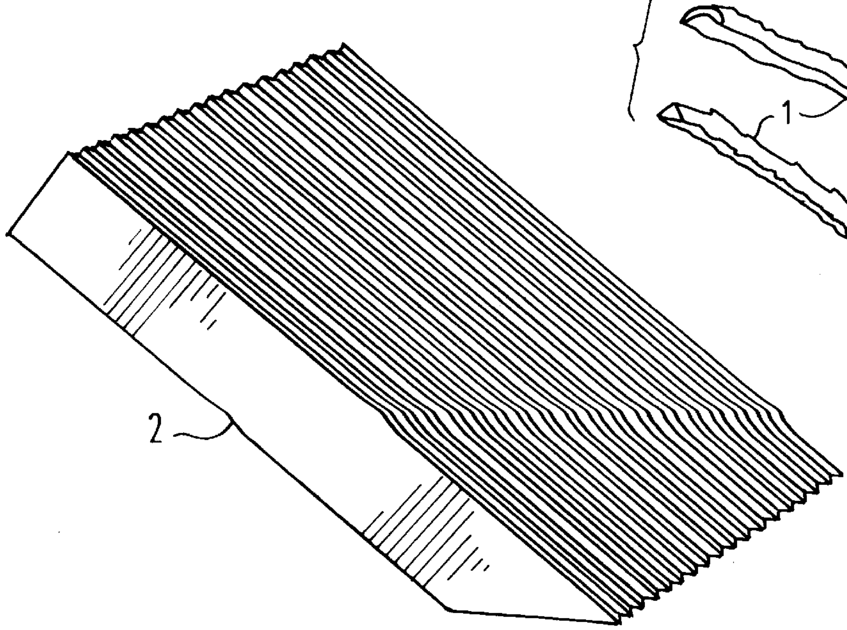
FIG. 2*b* is a depiction of a serrated blade use in the formation of shaved metal fibers in accordance with the preferred embodiment.
Figure 2C:
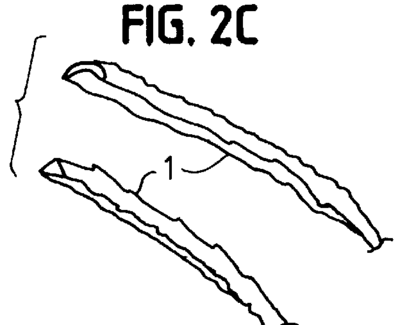
FIG. 2*c* is a depiction of the individual shaved metal fibers formed in accordance with the preferred embodiment.

FIGS. 2*a*–2*c* depict the preferred method for forming the individual metal fibers 1 Preferably, referring to FIG. 2*a*, the individual metal fibers 1 are formed by shaving metal member 2 with a succession of serrated cutting blades, one of which is indicated by reference numeral 3. The serrated pattern of cutting blade 3 is shown in FIG. 2*b*. Preferably, the succession of serrated blades have a variety of different serration patterns, so that the resulting individual fibers 1 have irregular cross-sections and rough outer surfaces. As more clearly shown in FIG. 2*c*, the irregular cross-sections vary along the length of the metal fibers, forming barbs on the outer surfaces of the fibers. The barbs, in turn, enhance interengagement among the fibers when they are formed into a nonwoven metal cloth. Many different metals are known by those of skill in the art to be suitable for formation of the mass of loose fibers, including carbon steel, stainless steel, copper, and brass.

Next, the individual fibers 1 are cut using a known suitable metal fiber cutting apparatus, such as a rotating knife, to give the individual fibers 1 a predetermined length ranging from about 1 to about 12 inches.

Referring again to FIG. 1, the cut fibers are formed into a mass of loose fibers 4, which is fed into conventional pre-carding/garnetting textile apparatus 5. Conventional pre-carding/garnetting textile apparatus 5 opens up the mass of loose fibers 4 and feeds them it at a specific rate to form a pre-measured fiber mass 6. The output feed rate of the apparatus 5 determine the fiber density of the final product.

If the preferred shaved fibers are to be carded or garnetted as shown in FIG. 1, then a suitable lubricant, such as oil, should be applied in order to promote movement of the individual fibers 1 relative to each other within the mass 4. The lubricant can be applied to the metal member 2 as it is being acted upon by the cutting blades, or at any other point in the process before carding, or garnetting. In the preferred embodiment, the pre-measured mass 6 is processed through a card or garnett machine 7, wherein it is carded/garnetted by one or more pairs of worker and stripper rolls to form a carded/garnetted metal fiber web 9.

The card or garnett machine 7 is a conventional textile apparatus, such as the machine made by Proctor & Schwartz or the like. It will be appreciated by those of skill in the art that the spacing of the cylinders and wires in the card or garnett machine will depend on the size and strength of the particular metal fibers.

After carding or garnetting, the carded/garnetted fiber web 9 is then lapped and needle-punched to form a nonwoven metal fabric as described below.

It will be appreciated by those of skill in the art that there are a number of alternative ways to form a metal fiber web suitable for producing the nonwoven fabric of the present invention. The preferred method for purposes of the present invention is to form the metal fibers into a web by conventional mechanical processes utilized in the textile field, such as the pre-carding and carding/garnetting, depicted in FIG. 1.

Alternatively, a metal fiber web can be formed by cutting the individual metal fibers as described above and processing them through known air-laid or wet-laid web-forming processes. Such known processes are described in the "INDA Handbook of Non-Woven Textiles" in the chapter entitled "How Nonwovens Are Made," the teachings of which are incorporated herein by reference. As a further alternative, a metal fiber web can be formed using uncut shaved fibers. This method would be particularly suitable for fibers over 80 microns in diameter. Narrow webs four to eight inches wide are formed from the continuous metal fibers coming directly off of the cutting blades. The narrow webs can be laid side-by-side with approximately one inch of overlap, and then needle-punched to be formed into a web. Such a web would then be suitable for interentanglement via lapping and needle-punching or one of the other methods described herein.

The metal fiber web 9 is fed via incline apron 8 to a suitable textile lapping apparatus 10, which can be found in common use in the textile field. The lapping apparatus oscillates back and forth as it feeds the fiber web through, to form a multi-layered fiber batt 11. The lapping apparatus 10 preferably changes the orientation of the metal fiber web 9 as it is being deposited in successive layers onto floor apron 12. In this way, the orientation of adjacent layers are rotated out of alignment from each other by a preselected angle, and the direction of the fibers varies between adjacent layers. The lapping apparatus shown in FIG. 1 is of the type known to those of skill in the art as a "camel-back lapper." A horizontal lapper could also be used, and could provide the added advantage of not stretching the fiber web like the vertical camel-back lapper does. However, applicants have found that the camel-back lapper is suitable for their needs.

Figure 3:
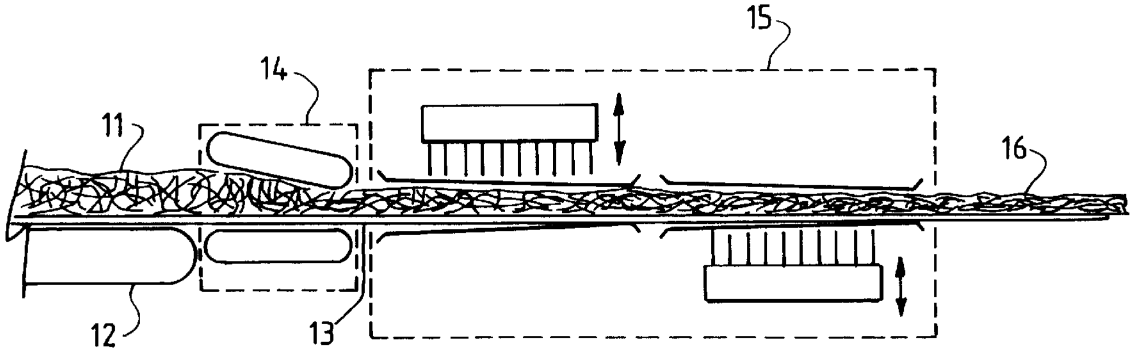
FIG. 3 is a schematic showing the formation of a reinforced metal fabric by attaching, via needle-punching, a reinforcing material to a multi-layered fiber web.

Referring now to FIG. 3, the multi-layered fiber batt 11 is then laid surface-to-surface with reinforcing backing 13. The reinforcing backing may be any of a number of suitable materials as dictated by the intended application, such as various known textiles and polymeric fabrics. The combined multi-layered fiber batt 11 and backing 13 are then fed through a batt condenser 14 and needle-punched by conventional needle-punch apparatus 15, which can be found in common use in the textile field, to form reinforced nonwoven metal fabric 16. Although this step can easily be accomplished through the use of any of a number of needle-punching machines, Applicants have achieved satisfactory results using a double-beam up-and-down stroke needle punch apparatus, such as the machine made by Bywater.

The needle-punching of the multiple layers accomplishes the desired result of interengaging the fibers of the respective layers in the metal fiber web with each other and with the backing 13, resulting in a reinforced needle-punched metal fabric. The needle-punching process causes the metal fibers to be interengaged not only within a given layer but also between different layers (in the "z" direction relative to the layers). The resulting fabric thus contains fibers that are interengaged in the X,Y, and Z directions, which interengagement promotes a suitably strong, coherent structure.

It will be appreciated by those of skill in the art that there are a number of alternative ways to accomplish the result of entangling or interengaging individual fibers with one another within and among the fiber web layers to form a nonwoven fabric. Applicants have found that the best interengagement results from needle-punching both sides of the structure; however, satisfactory results can be achieved using other equipment and other techniques, including punching only one side. Thus, although fiber interengagement may be accomplished via needle-punching as described above, it may equivalently be accomplished via such alternative means as hydro-entanglement using water jets, or creping or embossing.

General fiber carding, garnetting, lapping, and needling processes are described with reference to polymeric fibers in "The Nonwoven Textile Handbook," by The Association of the Non-Woven Fabrics Industry, and in U.S. Pat. No. 4,888,234 to Smith, the teachings of which are incorporated by reference.

A great number of different materials can be used for the reinforcing backing, as dictated by the particular application. Essentially, any material that can be penetrated with a needle could be used as a backing in the process described above.

Figure 4:
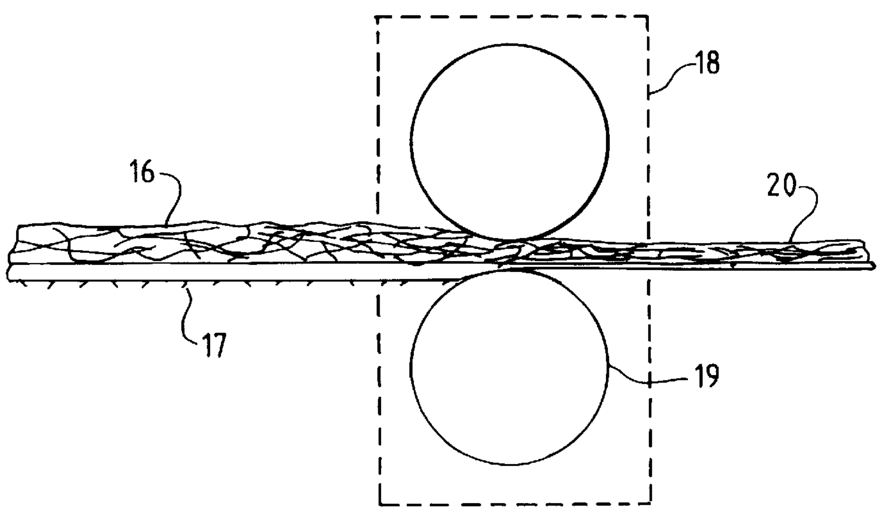
FIG. 4 is a schematic showing fusion bonding.

Referring, now to FIG. 4, if a backing containing polymeric fibers is used, then the attachment of the backing can be further strengthened, and the resulting fabric thereby enhanced, by fusion bonding as depicted in FIG. 4. The reinforced nonwoven metal fabric 16 is fed into a fusion-bonding unit 18, which typically contains a pair of feed rolls including heated roller 19 or the like. A conventional fusion-bonding unit, such as the machine made by Black Bros. or the like, may be used. As a result of the fiber interengagement techniques described above, individual metal fibers 17 will have penetrated through the reinforcing backing and be extending out of the reinforced nonwoven metal fabric 16 as shown. The roller that comes in contact with the polymeric backing, heated roller 19, is sufficiently hot that it heats the polymeric fibers in the backing to their melting point. In addition to heating, the rollers function to compress the reinforced metal fabric 16 so that the metal fibers 17 that protrude through the polymeric backing are bent over into the melted polymer fibers. When the fabric cools, the metal fibers are "fused" into place within the backing.

It will be appreciated by those of skill in the art that the above-described fusion bonding can be accomplished by a number of equivalent means. Thus, the polymeric backing may be heated to the melting point via heat lamps radiating onto the backing, or superheated air being blown onto the backing, or by open flame.

Figure 5:
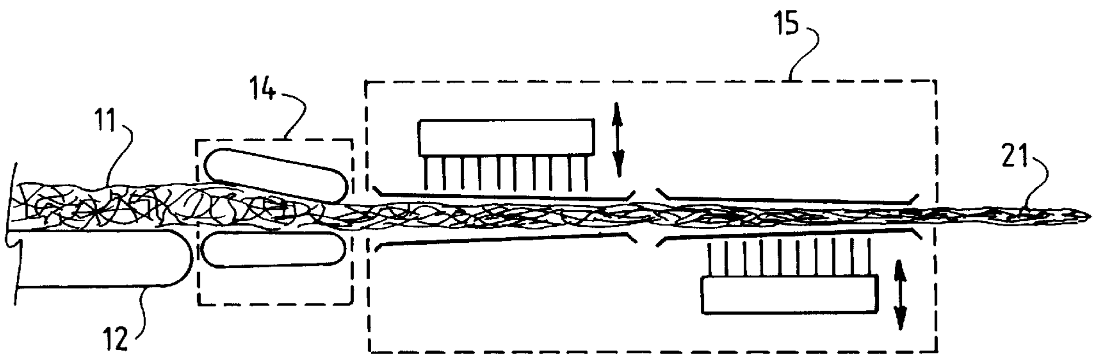
FIG. 5 is a schematic showing the formation of a nonreinforced metal fabric by needle-punching a multi-layered fiber web.

The reinforcing backing may be applied by means other than needle-punching and fusion bonding. As shown in FIG. 5, the multi-layered fiber batt 11 may be needle-punched as described above without the backing, resulting in a non-reinforced metal fabric 21. Various backing materials can then be applied to this fabric by any of a number of methods.

Figure 6:
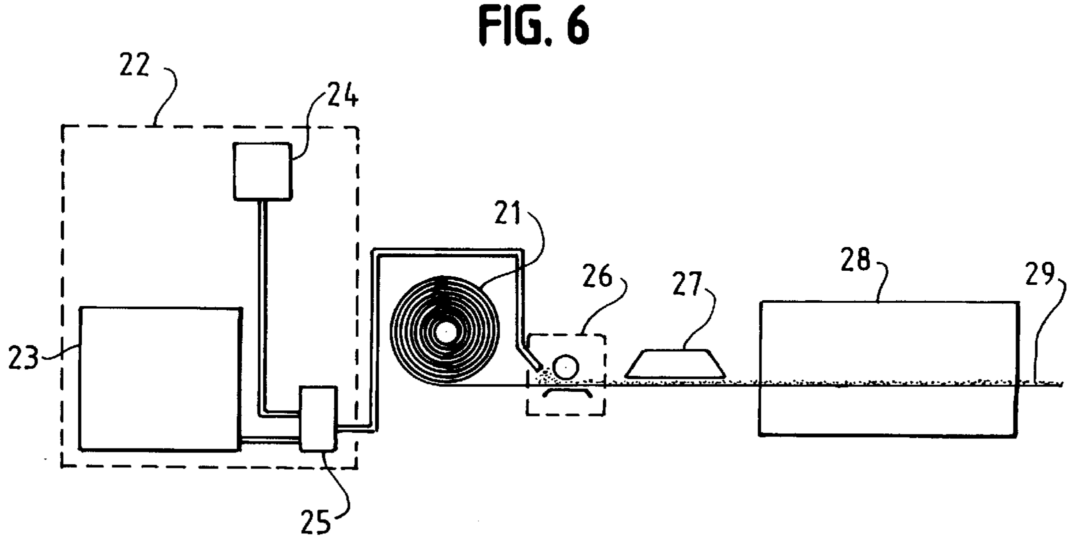
FIG. 6 is a schematic showing the application of liquid latex reinforcing material by frothing.

For example, as shown in FIG. 6, latex foam or any other similar material can be applied as a backing by conventional frothing. Liquid latex from latex tank 23 is frothed in a conventional frothing machine 22 by, for example, the introduction of compressed air from a compressor 24 into the chamber 25. The resulting foam is then applied to the metal fabric 21 by applicator 26. It is then processed through a flash dryer or a pre-heater 27 and curing oven 28 to result in foam-reinforced or latex-reinforced metal fabric 29. In an alternative application not shown, the foam or latex froth could be used as an adhesive for attaching another backing material, much like jute is attached to carpet.

Such backing can also be applied by a conventional roll-coating process. Yet another example is the application of various backing materials by gluing them to the non-reinforced metal fabric with any of a number of known suitable adhesives. Yet another example is to apply a polymeric backing via needle-punching as described above, and then flame-laminate another material to the polymeric backing. This is accomplished by heating the polymeric backing to the point where it becomes liquid, and then introducing a third material so that the polymeric layer acts as an adhesive to fix the third material to the metal fabric.

While the present invention has been described with reference to preferred embodiments thereof as illustrated in the accompanying drawings, those skilled in the art will recognize a number of changes and variations that can be made by without departing from the spirit and scope of the present invention.

What is claimed is:

1. A reinforced nonwoven metal fabric formed by:

providing a mass of loose metal fibers;

separating fibers from the mass to form a fiber web;

lapping the fiber web into layers to form a multiple-layered web structure;

needle-punching the multiple-layered web structure to interengage the fibers between the layers;

providing a nonmetallic backing material; and bonding the backing material to the needle-punched multiple-layered web structure.

2. The metal fabric of claim 1, wherein:

said nonmetallic backing material is bonded to said multiple-layered web structure by needle-punching.

3. The metal fabric of claim 2, wherein:

said nonmetallic backing material contains polymeric fibers, and is further secured to said multiple-layered web structure by fusion bonding.

4. The metal fabric of claim 1, wherein:

said loose metal fibers are formed by shaving a metal member with a succession of serrated blades.

5. The metal fabric of claim 1, wherein:

said fiber web is processed on a card or garnett prior to lapping and needle-punching.

6. The metal fabric of claim 1, wherein:

said nonmetallic backing is secured to the multiple-layered web structure by an adhesive.

7. The metal fabric of claim 1, wherein:

said nonmetallic backing is latex, and is secured by frothing.

* * * * *